United States Patent
Wang (10) Patent No.: US 12,356,054 B2
(45) Date of Patent: Jul. 8, 2025

(54) VIDEO DATA GENERATION METHOD AND APPARATUS, ELECTRONIC DEVICE, AND READABLE STORAGE MEDIUM

(71) Applicant: Beijing Zitiao Network Technology Co., Ltd., Beijing (CN)

(72) Inventor: Xiaowei Wang, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/543,949

(22) Filed: Dec. 18, 2023

(65) Prior Publication Data

US 2024/0163528 A1 May 16, 2024

Related U.S. Application Data

(63) Continuation of application No. PCT/CN2022/113281, filed on Aug. 18, 2022.

(30) Foreign Application Priority Data

Sep. 24, 2021 (CN) .......................... 202111119503.7

(51) Int. Cl.
*G06T 15/20* (2011.01)
*G06F 3/01* (2006.01)
(Continued)

(52) U.S. Cl.
CPC .......... *H04N 21/816* (2013.01); *G06F 3/011* (2013.01); *G06F 3/017* (2013.01); *G06T 15/00* (2013.01);
(Continued)

(58) Field of Classification Search
CPC ............ H04N 21/816; H04N 21/2187; H04N 21/23424; H04N 21/235; H04N 21/4781;
(Continued)

(56) References Cited

U.S. PATENT DOCUMENTS 8,177,611 B2* 5/2012 Kang .................... A63F 13/655
463/31
8,964,052 B1 2/2015 Wooley et al.
(Continued)

FOREIGN PATENT DOCUMENTS

CN 105425955 A 3/2016
CN 108961376 A 12/2018
(Continued)

OTHER PUBLICATIONS

Gai, "Research on real-time interaction method in virtual reality", Dissertation for Doctoral Degree, Shandong University, Nov. 15, 2017, 134 pages, with English Abstract.

*Primary Examiner* — John R Schnurr
(74) *Attorney, Agent, or Firm* — Astute IP Law Group (57) ABSTRACT

The present disclosure provides a video data generation method and apparatus, an electronic device, and a storage medium. The video data generation method includes: obtaining hand control information of a virtual image, and driving, based on the hand control information, a hand of the virtual image to move relative to the 3D scene; controlling a position of the virtual lens to move along with movement of the hand of the virtual image, wherein a relative distance between the position of the virtual lens and a position of the hand of the virtual image is within a first preset range; and generating video data based on lens information of the virtual lens and the 3D scene information.

17 Claims, 7 Drawing Sheets

(51) Int. Cl.
*G06T 15/00* (2011.01)
*G06V 40/20* (2022.01)
*H04N 21/2187* (2011.01)
*H04N 21/81* (2011.01)

(52) U.S. Cl.
CPC .............. *G06T 15/20* (2013.01); *G06V 40/28* (2022.01); *H04N 21/2187* (2013.01)

(58) Field of Classification Search
CPC ............ H04N 21/4788; H04N 21/8173; G06T 15/00; G06T 15/20; G06V 40/28; G06V 20/20; G06F 3/011; G06F 3/017
See application file for complete search history.

(56) References Cited

U.S. PATENT DOCUMENTS

| | | | |
|---|---|---|---|
| 11,044,535 B2 * | 6/2021 | Kurabuchi | H04N 21/4316 |
| 11,308,686 B1 * | 4/2022 | Boissière | G06F 3/012 |
| 2012/0040759 A1 | 2/2012 | Ito et al. | |
| 2015/0169176 A1 * | 6/2015 | Cohen | G06F 3/017 |
| | | | 715/852 |
| 2016/0093078 A1 | 3/2016 | Davis et al. | |
| 2016/0093108 A1 * | 3/2016 | Mao | G02B 27/017 |
| | | | 345/633 |
| 2017/0192496 A1 * | 7/2017 | Balslev | A63F 13/213 |
| 2018/0012407 A1 * | 1/2018 | Chuang | G06T 13/40 |
| 2019/0005732 A1 * | 1/2019 | Satake | G06V 40/28 |
| 2019/0102929 A1 * | 4/2019 | Davis | G06T 15/00 |
| 2020/0356233 A1 * | 11/2020 | Boesel | G06F 3/0346 |
| 2021/0319624 A1 * | 10/2021 | Kawabe | G06T 19/20 |
| 2021/0352254 A1 * | 11/2021 | Black | H04N 23/54 |
| 2022/0054939 A1 * | 2/2022 | Wei | A63F 13/92 |
| 2022/0214797 A1 * | 7/2022 | Xu | H04N 21/23418 |

FOREIGN PATENT DOCUMENTS

| | | |
|---|---|---|
| CN | 109859327 A | 6/2019 |
| CN | 111147873 A | 5/2020 |
| CN | 111672104 A | 9/2020 |
| CN | 111672106 A | 9/2020 |
| CN | 111773657 A | 10/2020 |
| CN | 113365085 A | 9/2021 |
| CN | 113384880 A | 9/2021 |
| CN | 113852838 A | 12/2021 |
| KR | 20180015427 A | 2/2018 |
| WO | 2018063957 A1 | 4/2018 |

* cited by examiner

VIDEO DATA GENERATION METHOD AND APPARATUS, ELECTRONIC DEVICE, AND READABLE STORAGE MEDIUM

CROSS REFERENCE TO RELATED APPLICATIONS

The present application is a continuation of International Patent Application No. PCT/CN2022/113281, filed on Aug. 18, 2022, which claims priority to Chinese Patent Application No. 202111119503.7, filed with the China National Intellectual Property Administration on Sep. 24, 2021 and entitled "VIDEO DATA GENERATION METHOD AND APPARATUS, ELECTRONIC DEVICE, AND READABLE STORAGE MEDIUM", and the entire content disclosed by the Chinese patent application is incorporated herein by reference as part of the present application.

TECHNICAL FIELD

The present disclosure relates to the field of computer technologies, and specifically, to a video data generation method and apparatus, an electronic device, and a storage medium.

BACKGROUND

With the development of computer technologies and network technologies, video live streaming has become a popular way of interaction. More and more users select to watch video live streaming through live streaming platforms, such as game live streaming and news live streaming, etc. In order to improve the live streaming effect, a manner in which a virtual image replaces an anchor for video live streaming occurs.

One form of the virtual image is to capture the motion of an actor (a person in the video) to obtain a control signal, drive a virtual image in a game engine to act, and at the same time, obtain the voice of the actor, fuse the voice of the actor with a virtual image screen, and generating video data.

However, because lens information (for example, a lens position and a lens orientation) in a video usually does not change, the virtual image needs to move in a fixed scene range to ensure that it appears in a video screen, resulting in monotonous and boring video screen content.

SUMMARY

Embodiments of the present disclosure at least provide a video data generation method and apparatus, an electronic device, and a storage medium.

In a first aspect, an embodiment of the present disclosure provides a video data generation method, applied to an electronic device, the electronic device is configured to run a 3D rendering environment, the 3D rendering environment includes 3D scene information, the 3D scene information is used to generate a 3D scene after rendering, the 3D scene information includes at least one piece of virtual image information and at least one virtual lens, the virtual image information is used to generate a virtual image after rendering, the virtual image is driven by control information captured by an action capture device, and the method includes:

obtaining hand control information of the virtual image, and driving, based on the hand control information, a hand of the virtual image to move relative to the 3D scene;

controlling a position of the virtual lens to move along with movement of the hand of the virtual image, wherein a relative distance between the position of the virtual lens and a position of the hand of the virtual image is within a first preset range; and generating video data based on lens information of the virtual lens and the 3D scene information.

In the embodiment of the present disclosure, when the hand of the virtual image is driven, based on the obtained hand control information of the virtual image, to perform a corresponding action, the position of the virtual lens is also controlled to move along with movement of the hand of the virtual image, that is, the position of the lens may be changed through movement of the hand of the virtual image, so that the lens information can be changed under control of the virtual image. In this way, the scene information in the generated video data is changed, richness and interest of the video data are improved, and viewing experience of users is further improved.

According to the first aspect, in one possible embodiment, an orientation of the virtual lens changes with the movement of the hand of the virtual image.

In the embodiment of the present disclosure, because the orientation of the virtual lens also changes with the movement of the virtual image hand, the scene captured by the virtual lens better meets the target requirement, the effect of the lens following shooting is achieved, and the viewing experience of users is improved.

According to the first aspect, in one possible embodiment, an angle between a lens orientation of the virtual lens and an arm of the virtual image is less than a first preset angle.

In the embodiment of the present disclosure, because an angle between a lens orientation of the virtual lens and an arm of the virtual image is less than a first preset angle, the orientation of the virtual lens changes and always faces the virtual image, so that the selfie effect is realized, and the display effect of the virtual lens is consistent with the display effect of the real anchor selfie.

According to the first aspect, in one possible embodiment, before the obtaining the hand control information of the virtual image, the method further includes:

obtaining first control information of the virtual image, and driving the virtual image to perform a first corresponding action; and when the first control information and/or the first corresponding action meets a first preset condition, binding the virtual lens with the hand of the virtual image, so that the relative distance between the position of the virtual lens and the position of the hand of the virtual image is within the first preset range.

In the embodiment of the present disclosure, when the first control information and/or the first corresponding action meets the first preset condition, the virtual lens and the hand of the virtual image are bound, that is, the virtual lens binding needs a trigger condition, thereby improving the interest of the generated video data.

According to the first aspect, in one possible embodiment, the binding the virtual lens with the hand of the virtual image includes:

invoking a virtual selfie stick to the 3D scene, and binding two ends of the virtual selfie stick with the hand of the virtual image and the virtual lens respectively.

In the embodiment of the present disclosure, the virtual lens and the virtual image hand are bound by the virtual selfie stick, which not only can simulate the following shooting effect of the real anchor, but also can improve the distance between the virtual lens and the hand of the virtual image, thereby capturing different 3D scenes, and improving the richness of video data generation.

According to the first aspect, in one possible embodiment, an angle between an orientation of the virtual lens and an arm of the virtual image is greater than a second preset angle.

In the embodiment of the present disclosure, the angle between the orientation of the virtual lens and the arm of the virtual image is greater than the second preset angle, that is, the orientation of the virtual lens faces away from the virtual image, so that the image captured by the virtual lens is different from the selfie effect, and different visual experience is provided for the user.

According to the first aspect, in one possible embodiment, an angle between the virtual selfie stick and a vertical line of an arm of the virtual image is within a second preset range.

In the embodiment of the present disclosure, because the angle between the virtual selfie stick and the vertical line of the arm of the virtual image is within the second preset range, the virtual selfie stick and the arm of the virtual image are approximately vertical, so that the action of the virtual image holding the virtual selfie stick is more realistic.

According to the first aspect, in one possible embodiment, before the generating the video data based on the lens information of the virtual lens and the 3D scene information, the method further includes:
  obtaining second control information of the virtual image, and driving the virtual image to perform a second corresponding action; and
  when the second control information and/or the second corresponding action meets a second preset condition, controlling to unbind the virtual lens and the hand of the virtual image, and adjusting the virtual lens to a state matching the second preset condition.

In the embodiment of the present disclosure, after the virtual lens and the virtual image are bound, when the second control information and/or the second corresponding action meets the second preset condition, the virtual lens and the virtual image hand can be unbound, thus realizing the free control of the lens and being more humanized.

According to the first aspect, in one possible embodiment, after the generating the video data, the method further includes:
  obtaining audio data, and fusing the video data with the audio data to generate a live video stream; and
  sending the live video stream to a target platform, so that the target platform performs video live streaming based on the live video stream.

In the embodiment of the present disclosure, after the video data is obtained, the audio data is also obtained, and the video data and the audio data are fused to generate a live video stream, so that the target platform can perform live stream based on the live video stream, and real-time interaction with the audience is realized.

According to the first aspect, in one possible embodiment, after the generating the video data, the method further includes:
  sending the video data to an electronic device having a stereoscopic display function for playing.

In the embodiment of the present disclosure, the video data is further sent to the electronic device with the stereoscopic display function for playing, so that the displayed video data has a 3D effect, and the visual experience of the user is further improved.

In a second aspect, an embodiment of the present disclosure provides a video data generation apparatus, including:
  a behavior driving module, configured to: obtain hand control information of a virtual image, and drive, based on the hand control information, a hand of the virtual image to move relative to a 3D scene;
  a lens control module, configured to control a position of a virtual lens to move along with movement of the hand of the virtual image, wherein a relative distance between the position of the virtual lens and a position of the hand of the virtual image is within a first preset range; and
  a video generation module, configured to generate video data based on lens information of the virtual lens and 3D scene information.

According to the second aspect, in one possible embodiment, an orientation of the virtual lens changes with the movement of the hand of the virtual image.

According to the second aspect, in one possible embodiment, an angle between a lens orientation of the virtual lens and an arm of the virtual image is less than a first preset angle.

According to the second aspect, in one possible embodiment, the behavior driving module is further configured to:
  obtain first control information of the virtual image, and drive the virtual image to perform a first corresponding action; and
  when the first control information and/or the first corresponding action meets a first preset condition, bind the virtual lens with the hand of the virtual image, so that the relative distance between the position of the virtual lens and the position of the hand of the virtual image is within the first preset range.

According to the second aspect, in a possible implementation, the behavior driving module is specifically configured to:
  when the first control information and/or the first corresponding action meets a first preset condition, invoke a virtual selfie stick to the 3D scene, and bind two ends of the virtual selfie stick with the hand of the virtual image and the virtual lens respectively.

According to the second aspect, in a possible implementation, an angle between an orientation of the virtual lens and an arm of the virtual image is greater than a second preset angle.

According to the second aspect, in a possible implementation, an angle between the virtual selfie stick and a vertical line of an arm of the virtual image is within a second preset range.

According to the second aspect, in a possible implementation, the behavior driving module is further configured to:
  obtain second control information of the virtual image, and drive the virtual image to perform a second corresponding action; and
  when the second control information and/or the second corresponding action meets a second preset condition, control to unbind the virtual lens and the hand of the virtual image, and adjust the virtual lens to a state matching the second preset condition.

According to the second aspect, in a possible implementation, the apparatus further includes:
  a data fusion module, configured to: obtain audio data, and fuse the video data with the audio data to generate a live video stream; and
  a video sending module, configured to send the live video stream to a target platform, so that the target platform performs video live streaming based on the live video stream.

According to the second aspect, in a possible implementation, the video sending module is further configured to:
send the video data to an electronic device having a stereoscopic display function for play.

In a third aspect, an embodiment of the present disclosure provides an electronic device, including: a processor, a memory, and a bus, wherein the memory stores a machine-readable instruction that is capable of being executed by the processor, when the electronic device runs, the processor communicates with the memory by the bus, and when the machine-readable instruction is executed by the processor, the video data generation method according to the first aspect is performed.

In a fourth aspect, an embodiment of the present disclosure provides a non-transient computer-readable storage medium, wherein the computer-readable storage medium stores a computer program, and when the computer program is run by a processor, the video data generation method according to the first aspect is performed.

In order to make the foregoing objectives, features and advantages of the present disclosure more obvious and understandable, the following provides detailed descriptions by using preferred embodiments in cooperation with the accompanying drawings.

BRIEF DESCRIPTION OF THE DRAWINGS

In order to more clearly describe the technical solutions of embodiments of the present disclosure, the following briefly describes the accompanying drawings to be used in embodiments. The accompanying drawings herein are incorporated in this specification and form a part of this specification, show embodiments consistent with the present disclosure, and are used together with this specification to describe the technical solutions of the present disclosure. It should be understood that the following accompanying drawings show only some embodiments of the present disclosure, and therefore should not be regarded as limiting the scope, and a person of ordinary skill in the art may further obtain other relevant accompanying drawings from these accompanying drawings without creative efforts.

DETAILED DESCRIPTION

To make the objectives, technical solutions, and advantages of embodiments of the present disclosure clearer, the following clearly and completely describes the technical solutions in embodiments of the present disclosure with reference to the accompanying drawings in embodiments of the present disclosure. Apparently, the described embodiments are merely some rather than all of the embodiments of the present disclosure. The components in embodiments of the present disclosure described and shown in the accompanying drawings herein may be usually arranged and designed in a variety of different configurations. Therefore, the following detailed descriptions of embodiments of the present disclosure provided in the accompanying drawings are not intended to limit the scope of the present disclosure for which protection is claimed, but rather represents only selected embodiments of the present disclosure. Based on embodiments of the present disclosure, all other embodiments obtained by a person skilled in the art without creative efforts fall within the protection scope of the present disclosure.

It should be noted that similar reference numerals and letters indicate similar items in the following accompanying drawings, so that once an item is defined in one accompanying drawing, it does not need to be further defined and explained in subsequent accompanying drawings.

The term "and/or" in this specification describes only an association relationship, and indicates that three relationships may exist. For example, A and/or B may represent: Only A exists, both A and B exist, and only B exists. In addition, the term "at least one" in this specification indicates any one of a plurality or any combination of at least two of a plurality. For example, including at least one of A, B, and C may indicate including any one or more elements selected from a set consisting of A, B, and C.

With the development of computer technologies and network technologies, video live streaming has become a popular way of interaction. More and more users select to watch video live streaming through live streaming platforms, such as game live streaming and news live streaming, etc. In order to improve the live streaming effect, a manner in which a virtual image replaces an anchor for video live streaming occurs.

One form of the virtual image is to capture the motion of an actor (a person in the video) to obtain a control signal, drive a virtual image in a game engine to act, and at the same time, obtain the voice of the actor, fuse the voice of the actor with a virtual image screen, and generating video data.

It is found through research that, because lens information (for example, a lens position and a lens orientation) in a video usually does not change, the virtual image needs to move in a fixed scene range to ensure that it appears in a video screen, resulting in monotonous and boring video screen content.

The present disclosure provides a video data generation method, applied to an electronic device. The electronic device is configured to run a 3D rendering environment, the 3D rendering environment includes 3D scene information, the 3D scene information is used to generate a 3D scene after rendering, the 3D scene information includes at least one piece of virtual image information and at least one virtual lens, the virtual image information is used to generate a virtual image after rendering, the virtual image is driven by control information captured by an action capture device, and the method includes:

obtaining hand control information of the virtual image, and driving, based on the hand control information, a hand of the virtual image to move relative to the 3D scene; controlling a position of the virtual lens to move along with movement of the hand of the virtual image, in which a relative distance between the position of the virtual lens and a position of the hand of the virtual image is within a first preset range; and generating video data based on lens information of the virtual lens and the 3D scene information.

The 3D rendering environment is a 3D game engine that runs in the electronic device and can generate, based on data to be rendered, image information based on one or more angles of view. The virtual image information is an image model that exists in the game engine and can be used to generate a corresponding virtual image after rendering. Virtual images may include a virtual character image, a virtual animal image, a virtual cartoon image, and the like, which is not limited herein.

The 3D scene information may run in a CPU (Central Processing Unit), a GPU (Graphics Processing Unit), and a memory of a computer and includes meshed model information and mapping texture information. Correspondingly, as an example, the virtual image data and virtual object data include, but are not limited to, meshed model data, voxel data, and mapping texture data, or a combination thereof. Meshes include but are not limited to, triangular meshes, quadrilateral meshes, other polygonal meshes, or a combination thereof. In embodiments of the present disclosure, the meshes are triangular meshes.

An action capture device includes a limb action capture device worn on the body (for example, clothes), a hand action capture device worn on hands (for example, gloves), a facial action capture device (for example, a camera), and a sound capture device (for example, a microphone or a throat microphone).

In the embodiment of the present disclosure, when the hand of the virtual image is driven, based on the obtained hand control information of the virtual image, to perform a corresponding action, the position of the virtual lens is also controlled to move along with movement of the hand of the virtual image, that is, the position of the lens may be changed through movement of the hand of the virtual image, so that the lens information can be changed under control of the virtual image. In this way, the scene information in the generated video data is changed, richness and interest of the video data are improved, and viewing experience of users is further improved.

Figure 1:
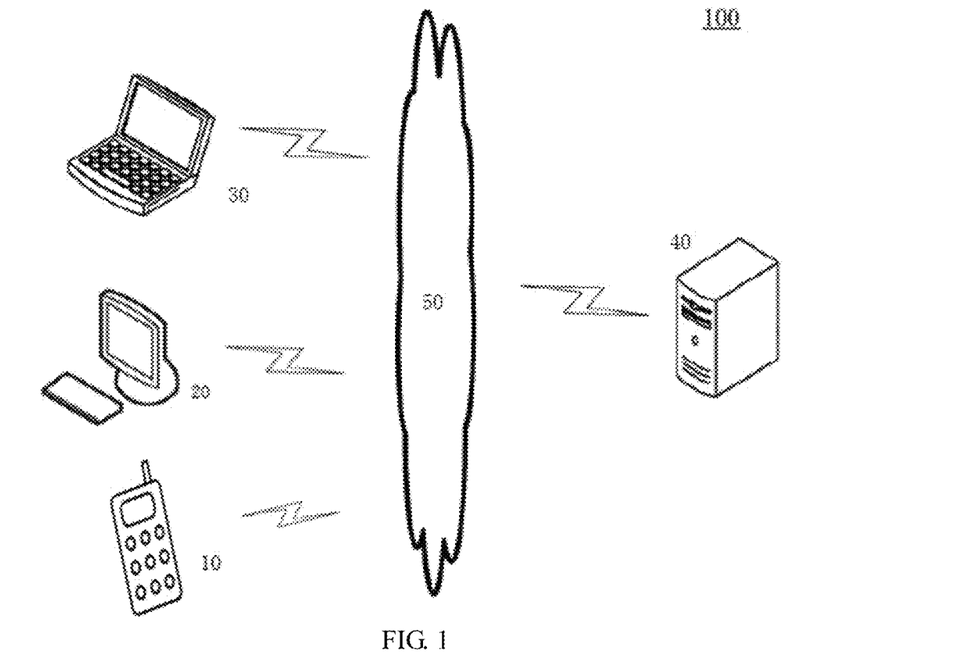
FIG. 1 is a schematic diagram of an execution body of a video data generation method provided by an embodiment of the present disclosure.

FIG. 1 is a schematic diagram of an execution body of a video data generation method provided by an embodiment of the present disclosure. The execution body of the method is an electronic device 100, and the electronic device 100 may include a terminal and a server. For example, the method may be applied to a terminal. The terminal may be a smartphone 10, a desktop computer 20, a notebook computer 30, or the like shown in FIG. 1, or a smart speaker, a smart watch, a tablet computer, or the like that is not shown in FIG. 1, which is not limited. The method may also be applied to a server 40, or may be applied in an implementation environment including the terminal and the server 40. The server 40 may be an independent physical server, or may be a server cluster or distributed system including a plurality of physical servers, or may be a cloud server providing a basic cloud computing service such as a cloud service, a cloud database, cloud computing, cloud storage, big data, and an artificial intelligence platform.

In some other implementations, the electronic device 100 may also include an AR (Augmented Reality) device, a VR (Virtual Reality) device, an MR (Mixed Reality) device, and the like. For example, the AR device may be a mobile phone or a tablet computer having an AR function, or AR glasses, which is not limited herein.

It should be noted that, in some implementations, the server 40 may communicate with the smartphone 10, the desktop computer 20, and the notebook computer 30 by a network 50 separately. The network 50 may include various connection types, such as wired and wireless communication links or fiber optic cables.

In implementations of the present disclosure, the video data generation method is applied to an electronic device (for example, the server 40 in FIG. 1). The electronic device is used to run a 3D rendering environment, the 3D rendering environment includes 3D scene information, the 3D scene information is used to generate a 3D scene after rendering, and the 3D scene information includes at least one piece of virtual image information and at least one virtual lens. The virtual lens is used to capture image information of the 3D scene. The virtual image information is used to generate a virtual image after rendering, and the virtual image is driven by control information captured by an action capture device. In some possible implementations, the video data generation method may be achieved by a manner of invoking, by a processor, computer-readable instructions stored in a memory.

Figure 2:
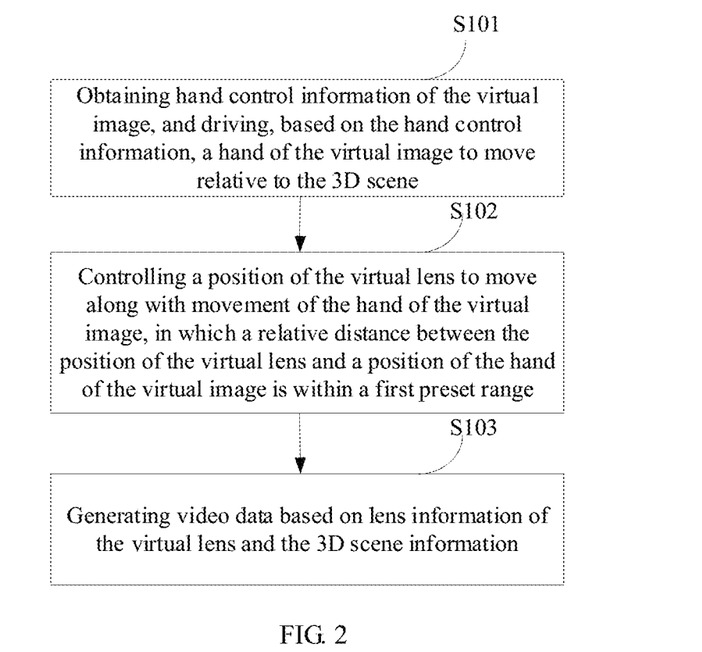
FIG. 2 is a flowchart of a first video data generation method provided by an embodiment of the present disclosure.

FIG. 2 is a flowchart of a first video data generation method provided by an embodiment of the present disclosure. The video data generation method includes the following S101~S103:

S101: Obtaining hand control information of the virtual image, and driving, based on the hand control information, a hand of the virtual image to move relative to the 3D scene.

The hand of the virtual image in this embodiment of the present disclosure refers to a target hand of the virtual image which is a hand that is determined to associate with the virtual lens from two hands of the virtual image, rather than the other hand.

For example, the hand control information is generated by an actor. Hand action data of the actor may be collected in real time, so as to further obtain the hand control information of the virtual image. The hand includes but is not limited to related parts such as a palm, a finger, and an arm.

Specifically, action data of the palm and the finger of the actor may be obtained through an action capture device on gloves of the actor, and action data of the arm of the actor may be obtained through an action capture device on clothes on the actor, so as to obtain the hand control information of the virtual image. The hand control information is not limited to movement information of the hand, and also includes displacement information of the hand relative to the 3D scene caused by movement of the body of the virtual image.

It should be noted that the obtaining of the hand control information is not limited to the action capture device on the gloves of the actor, and the hand control information may also be obtained in other manners, which is not limited herein. In addition, the hand of the virtual image generating movement relative to the 3D scene refers to that a state of the hand of the virtual image relative to the 3D scene changes, and the state includes movement, rotation, or a combination thereof of the hand of the virtual image relative to the 3D scene, and the like, which is not limited herein.

Driving the hand of the virtual image to perform a corresponding action means that the action performed by the virtual image is consistent with or conforms to the hand control information. That is, the action performed by the virtual image is consistent with or conforms to the action of the actor. For example, if the actor performs a fist-clenching action, correspondingly, the virtual image is also driven to perform a fist-clenching action; or if the actor performs a palm-expanding action, the virtual image also performs a corresponding palm-expanding action.

S102: Controlling a position of the virtual lens to move along with movement of the hand of the virtual image, in which a relative distance between the position of the virtual lens and a position of the hand of the virtual image is within a first preset range.

For example, after the hand of the virtual image moves, the position of the virtual lens is further controlled to move along with movement of the hand of the virtual image. That is, the virtual lens may be bound with the hand of the virtual image, so that the relative distance between the position of the virtual lens and the position of the hand of the virtual image is within the first preset range. The first preset range may be set according to a specific requirement. For example, the virtual lens may be disposed on the hand of the virtual image, so as to achieve the feeling that the hand of the virtual image holds the virtual lens to take a selfie. In this case, although the virtual lens is in the position of the hand of the virtual image, because of the movement of the virtual image, the relative position between the virtual lens and the hand of the virtual image is changed, and this change is within the first preset range.

In some implementations, an orientation of the virtual lens changes with the movement of the hand of the virtual image. That is, when the hand of the virtual image moves, the orientation of the virtual lens also changes. A preset association relationship may exist between the change of the orientation of the virtual lens and a movement direction of the hand of the virtual image. For example, when the hand of the virtual image rotates clockwise, the orientation of the virtual lens also rotates clockwise; or when the hand of the virtual image rotates anticlockwise, the orientation of the virtual lens al so rotates anticlockwise.

In some other implementations, in order to achieve the effect of the virtual image taking a selfie, an angle between the lens orientation of the virtual lens and the arm of the virtual image is less than a first preset angle, so that the virtual lens is oriented towards the virtual image. The first preset angle is not greater than 90 degrees.

In addition, the angle between the orientation of the virtual lens and the arm of the virtual image may also be greater than a second preset angle. In this case, the virtual lens is used to shoot a scene in a direction opposite to the virtual image. Different viewing experiences are provided for users. The second preset angle may be greater than 90 degrees.

S103: Generating video data based on lens information of the virtual lens and the 3D scene information.

It may be understood that, because the virtual lens is used to capture image information of the 3D scene, the video data may be generated based on the lens information of the virtual lens and the 3D scene information. The video data includes a plurality of video frames. For example, the generated video data may be displayed locally, may form a recorded video, or may form a live video stream for live streaming. For example, when the electronic device has its own display or is externally connected to a display apparatus, the generated video data may be played locally.

Figure 3:
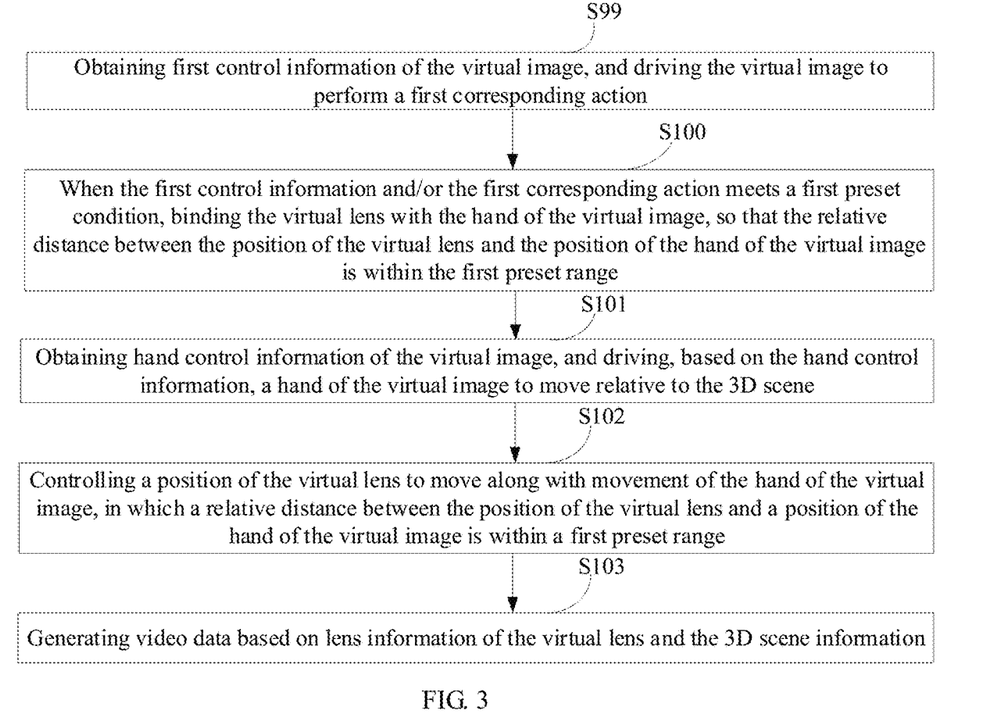
FIG. 3 is a flowchart of a second video data generation method provided by an embodiment of the present disclosure.

FIG. 3 is a flowchart of a second video data generation method provided by an embodiment of the present disclosure. Different from the method shown in FIG. 2, the video data generation method further includes the following S99~S100 before step S101.

S99: Obtaining first control information of the virtual image, and driving the virtual image to perform a first corresponding action.

For example, the first control information is generated by the actor. Action data and voice data of the actor may be collected in real time, to further obtain the first control information. For example, facial expression information and body action information of the actor may be captured by a camera, and the voice information of the actor may be further collected by a microphone. After the first control information is obtained, the virtual image may be driven, based on the first control information, to perform the first corresponding action.

The first corresponding action refers to that an action performed by the virtual image is consistent with or conforms to the first control information. For example, when the first control information of jumping is obtained, the virtual image is driven to perform the first corresponding action of jumping; when the first control information of a facial expression of happy laughing is obtained, the virtual image is driven to perform the first corresponding action of happy laughing; or when the first control information including a speech facial expression and speech content audio is obtained, the virtual image is driven to perform a mouth action and make a corresponding sound.

S100: When the first control information and/or the first corresponding action meets a first preset condition, binding the virtual lens with the hand of the virtual image, so that the relative distance between the position of the virtual lens and the position of the hand of the virtual image is within the first preset range.

Figure 4:
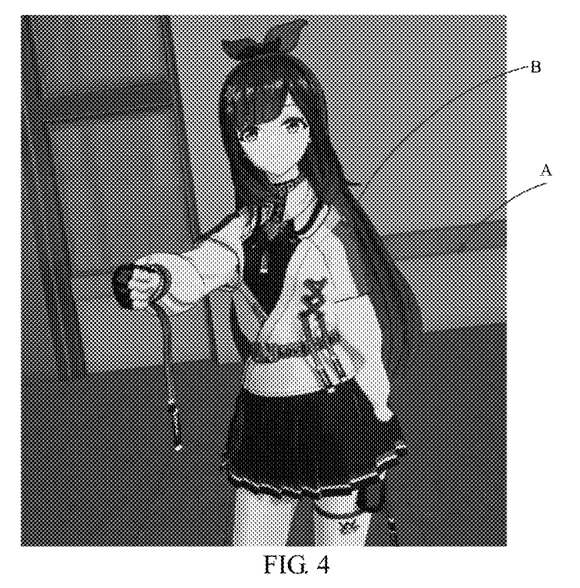
FIG. 4 is a schematic diagram of display of a first 3D scene provided by an embodiment of the present disclosure.

The first preset condition may be preset according to a specific situation, which is not limited herein. With reference to FIG. 4, the first preset condition may be a fist-clenching action of a virtual image B. Therefore, when the virtual image B performs the fist-clenching action, it may be determined that the first corresponding action meets the first preset condition. In this case, the virtual lens is bound with the hand of the virtual image, so that the relative distance between the position of the virtual lens and the position of the hand of the virtual image is within the first preset range.

In this embodiment of the present disclosure, the virtual lens is bound with the hand of the virtual image through a virtual selfie stick. Therefore, when the first control information and/or the first corresponding action meets the first preset condition, a virtual selfie stick (not shown in the figure) is invoked to the 3D scene A, and two ends of the virtual selfie stick are bound with the hand of the virtual image and the virtual lens respectively.

It may be understood that, in this implementation, the virtual selfie stick is not rendered in the rendering process, that is, the virtual selfie stick is not displayed in the video data. However, in another implementation, the virtual selfie stick may be rendered and displayed, which is not limited herein.

In addition, in order to improve the display effect, an angle between the virtual selfie stick and a vertical line of the arm of the virtual image is within a second preset range. That is, the virtual selfie stick and the arm are basically perpendicular to each other. In this way, the display effect of the virtual image is more in line with the effect of a real anchor, and watching experience is improved. The second preset range may be a range of 5 degrees to 10 degrees, which is not limited.

It should be noted that the first control information for determining whether the first preset condition is met includes not only the first control information, but also intermediate data information generated in the process of driving to generate the first corresponding action based on the first control information, which is not limited herein. In addition, data of the invoked virtual selfie stick includes meshed model data and mapping texture data.

Figure 5:
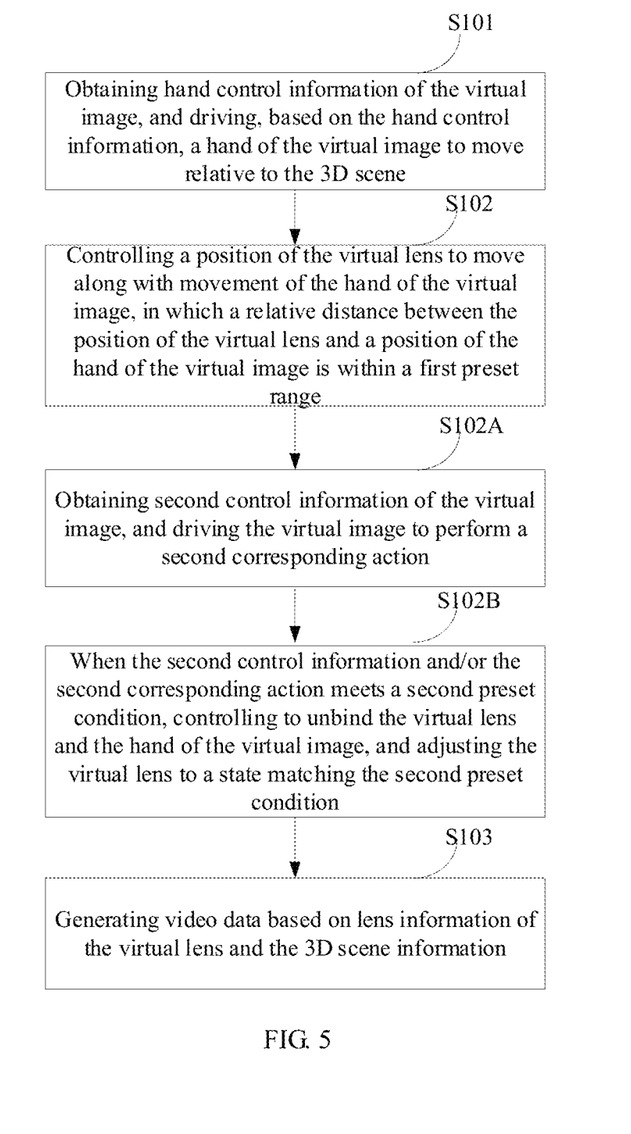
FIG. 5 is a flowchart of a third video data generation method provided by an embodiment of the present disclosure.

FIG. 5 is a flowchart of a third video data generation method provided by an embodiment of the present disclosure. Different from the first method shown in FIG. 2, the video data generation method further includes the following S102A~S102B before step S103.

S102A: Obtaining second control information of the virtual image, and driving the virtual image to perform a second corresponding action.

For example, similar to the first corresponding action, the second corresponding action refers to that an action performed by the virtual image is consistent with or conforms to the second control information.

Figure 6:
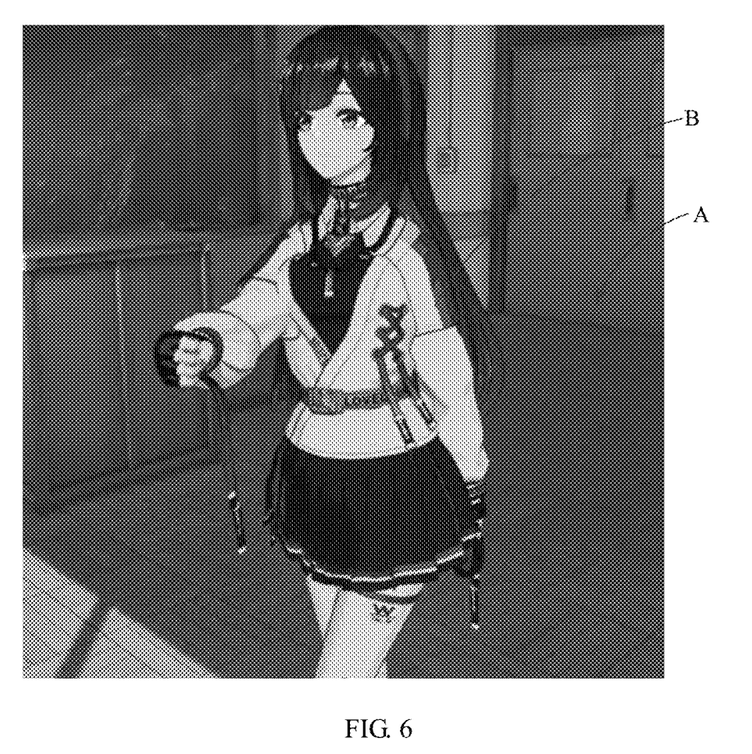
FIG. 6 is a schematic diagram of display of a second 3D scene provided by an embodiment of the present disclosure.

It may be understood that, after the virtual lens moves along with movement of the hand of the virtual image, the second control information of the virtual image may be also obtained, to drive the virtual image to perform the second corresponding action. With reference to FIG. 6, when the second control information of walking is obtained, the virtual image B is driven to perform the second corresponding action of walking. In this way, the position of the virtual lens changes, so that content of the 3D scene A displayed in the video data changes compared with FIG. 4.

S102B: When the second control information and/or the second corresponding action meets a second preset condition, controlling to unbind the virtual lens and the hand of the virtual image, and adjusting the virtual lens to a state matching the second preset condition.

For example, the second control information is similar to the first control information and may also be generated by the actor. Action data and voice data of the actor may be collected in real time, to further obtain the second control information. In addition, the second control information may also be generated by a device having a control function such as a remote control. The second preset condition is similar to the first preset condition, and may also be specifically set according to a specific situation.

In some embodiments, the second preset condition may be a palm-expanding action of the virtual image. In another embodiment, the second preset condition may also be that a voice drive information is "unbind", or the like.

Figure 7:
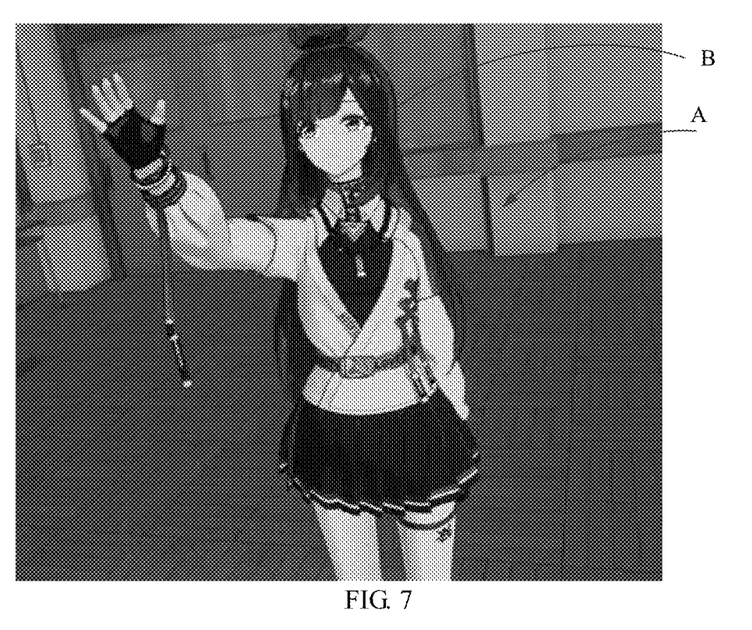
FIG. 7 is a schematic diagram of display of a third 3D scene provided by an embodiment of the present disclosure.

With reference to FIG. 7, when the virtual image B performs the palm-expanding action, it is determined that the second corresponding action meets the second preset condition. In this case, the virtual lens is controlled to unbind the hand of the virtual image, and the virtual lens is adjusted to a state matching the second preset condition.

Figure 8:
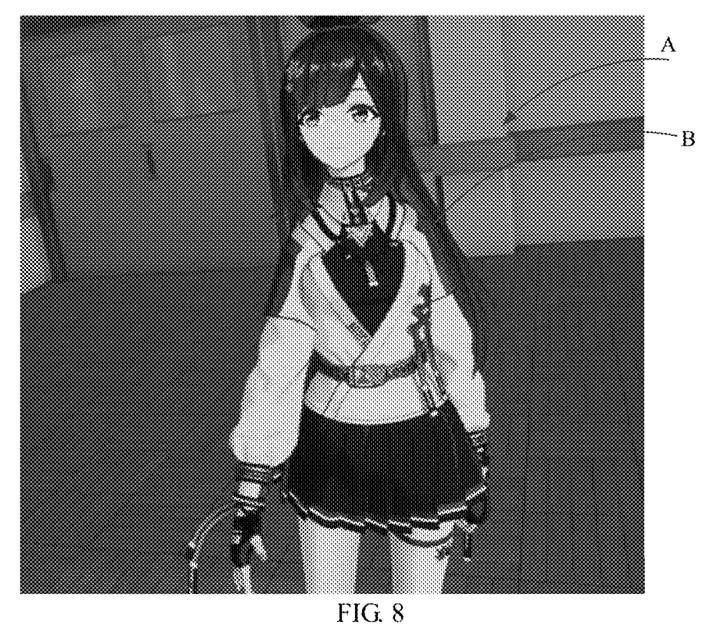
FIG. 8 is a schematic diagram of display of a fourth 3D scene provided by an embodiment of the present disclosure.

With reference to FIG. 8, after the virtual lens and the hand of the virtual image are unbound, the virtual lens is adjusted to the state matching the second preset condition. In this case, the lens information of the virtual lens is not controlled by the hand of the virtual image. That is, even if the hand of the virtual image moves, information such as a lens position and a lens orientation of the virtual lens does not change. In other words, static display content presented in the 3D scene A in the video at this time does not change.

The virtual lens and the second preset condition matching refer to that a plurality of states of the virtual lens may be preset for different second preset conditions. For example, the second preset condition for palm stretching matches a first state of the virtual lens, and the second preset condition for voice content "unbind" matches a second state of the virtual lens, and other matching relationships may be set according to specific situations, and are not described by using examples one by one herein.

Figure 9:
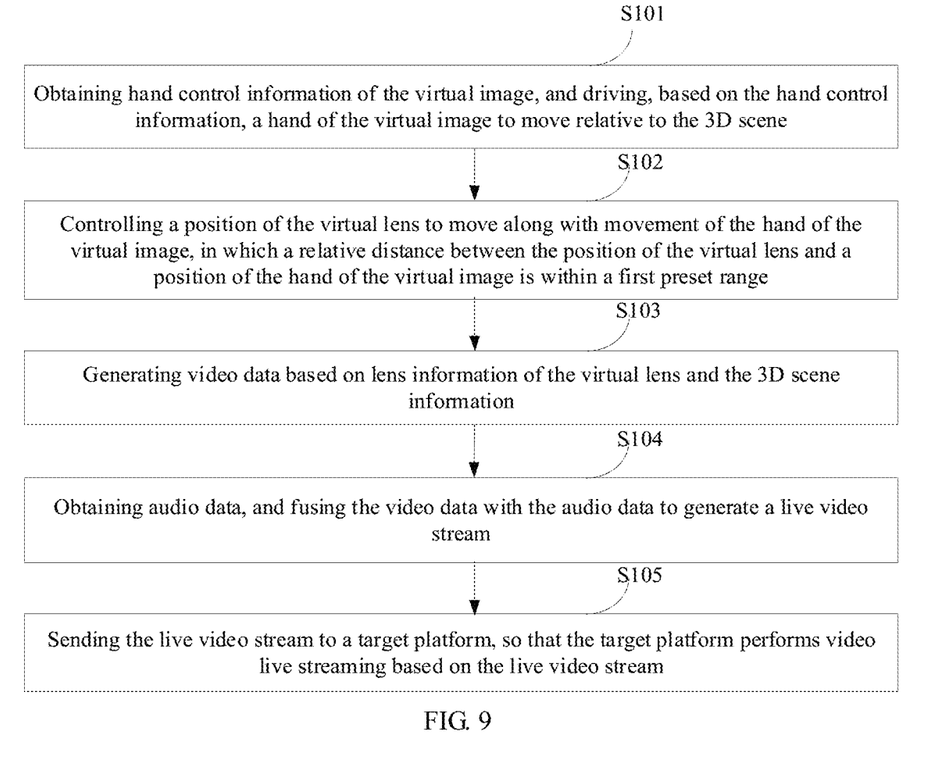
FIG. 9 is a flowchart of a fourth video data generation method provided by an embodiment of the present disclosure.

FIG. 9 is a flowchart of a fourth video data generation method provided by an embodiment of the present disclosure. Different from the first method shown in FIG. 2, the video data generation method further includes the following S104~S105 after step S103.

S104: Obtaining audio data, and fusing the video data with the audio data to generate a live video stream.

S105: Sending the live video stream to a target platform, so that the target platform performs video live streaming based on the live video stream.

Figure 10:
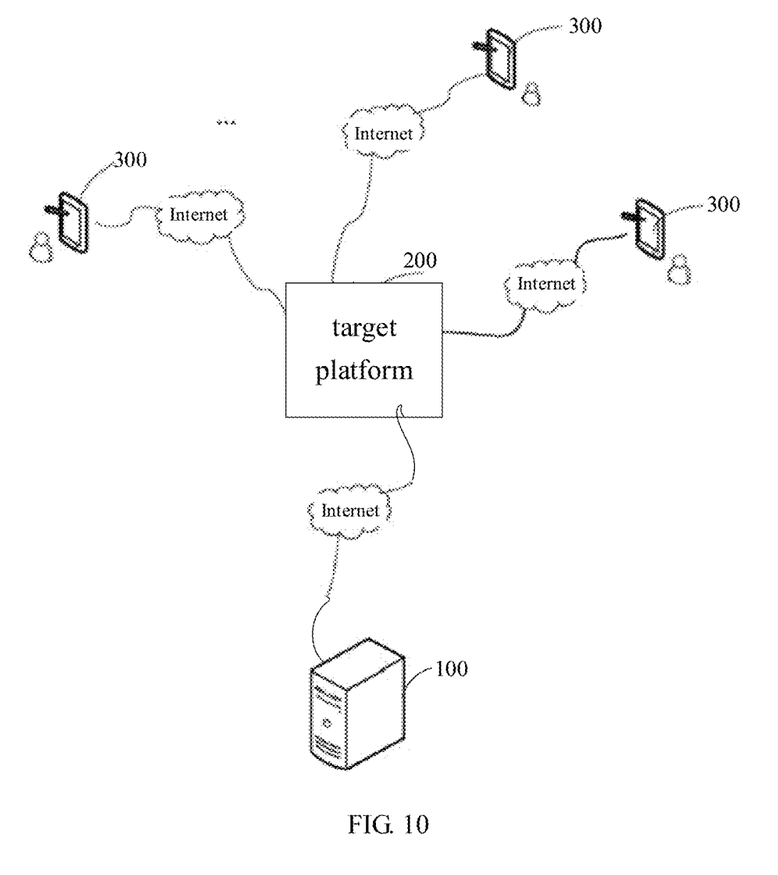
FIG. 10 is a schematic diagram of an architecture in which video data is sent to a target platform provided by an embodiment of the present disclosure.

For example, with reference to FIG. 10, the video data is a live video stream, so that the video data can be sent to a target platform 200 in real time, and the target platform 200 then sends the video data to a user device terminal 300 for video live streaming.

In some other embodiments, after the video data is obtained, the video data may further be sent to an electronic device with a stereoscopic display function for playing. In this implementation, the video data includes a plurality of paths of video data with specific visual characteristics (for example, two virtual lenses keeping a specific distance from each other, other parameters meeting preset conditions, and synchronous collection). Electronic devices with the stereoscopic display function include, but are not limited to, an AR (Augment Reality) device, a VR (Virtual Reality) device, and an MR (Mixed Reality) device.

A person skilled in the art may understand that, in the foregoing methods of specific implementations, the order in which the steps are written does not means a strict order of execution, and does not constitute any limitation on the implementation process, and the specific order of execution of the steps should be determined by functions and possible internal logic of the steps.

Based on a same technical idea, an embodiment of the present disclosure also provides a video data generation apparatus corresponding to the video data generation method. Because the apparatus in this embodiment of the present disclosure resolves the problem in a principle similar to that of the foregoing video data generation method in embodiments of the present disclosure. Therefore, for the implementation of the apparatus, reference may be made to the implementation of the method described above, and details are not repeated again.

Figure 11:
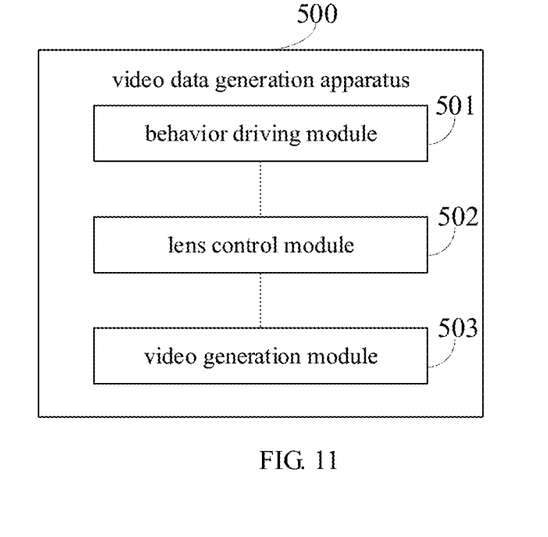
FIG. 11 is a schematic diagram of a structure of a video data generation apparatus provided by an embodiment of the present disclosure.

FIG. 11 is a schematic diagram of a video data generation apparatus 500 provided by an embodiment of the present disclosure. The apparatus includes:

a behavior driving module 501, configured to: obtain hand control information of a virtual image, and drive, based on the hand control information, a hand of the virtual image to move relative to a 3D scene;

a lens control module 502, configured to control a position of a virtual lens to move along with movement of the hand of the virtual image, in which a relative distance between the position of the virtual lens and a position of the hand of the virtual image is within a first preset range; and a video generation module 503, configured to generate video data based on lens information of the virtual lens and 3D scene information.

In a possible implementation, an orientation of the virtual lens changes with movement of the hand of the virtual image.

In a possible implementation, an angle between a lens orientation of the virtual lens and an arm of the virtual image is less than a first preset angle.

In a possible implementation, the behavior driving module 501 is further configured to:

obtain first control information of the virtual image, and drive the virtual image to perform a first corresponding action; and when the first control information and/or the first corresponding action meets a first preset condition, bind the virtual lens with the hand of the virtual image, so that the relative distance between the position of the virtual lens and the position of the hand of the virtual image is within the first preset range.

In a possible implementation, the behavior driving module 501 is specifically configured to:

when the first control information and/or the first corresponding action meets a first preset condition, invoke a virtual selfie stick to the 3D scene, and bind two ends of the virtual selfie stick with the hand of the virtual image and the virtual lens respectively.

In a possible implementation, an angle between an orientation of the virtual lens and an arm of the virtual image is greater than a second preset angle.

In a possible implementation, an angle between the virtual selfie stick and a vertical line of an arm of the virtual image is within a second preset range.

In a possible implementation, the behavior driving module 501 is further configured to:

obtain second control information of the virtual image, and drive the virtual image to perform a second corresponding action; and when the second control information and/or the second corresponding action meets a second preset condition, control to unbind the virtual lens and the hand of the virtual image, and adjust the virtual lens to a state matching the second preset condition.

Figure 12:
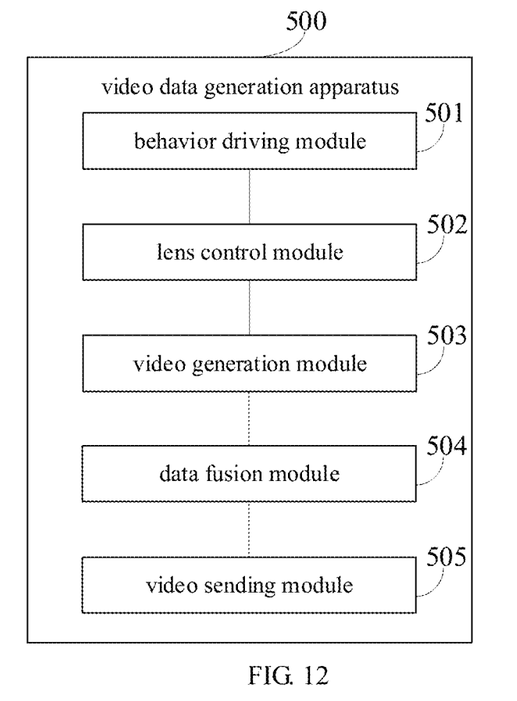
FIG. 12 is a schematic diagram of a structure of another video data generation apparatus provided by an embodiment of the present disclosure.

In a possible implementation, with reference to FIG. 12, the apparatus 500 further includes:

a data fusion module 504, configured to: obtain audio data, and fuse the video data with the audio data to generate a live video stream; and a video sending module 505, configured to send the live video stream to a target platform, so that the target platform performs video live streaming based on the live video stream.

In a possible implementation, the video sending module 505 is further configured to:

send the video data to an electronic device having a stereoscopic display function for play.

Reference may be made to related descriptions in the foregoing method embodiment for descriptions of processing procedures of the modules in the apparatus, and procedures of interactions between the modules.

Figure 13:
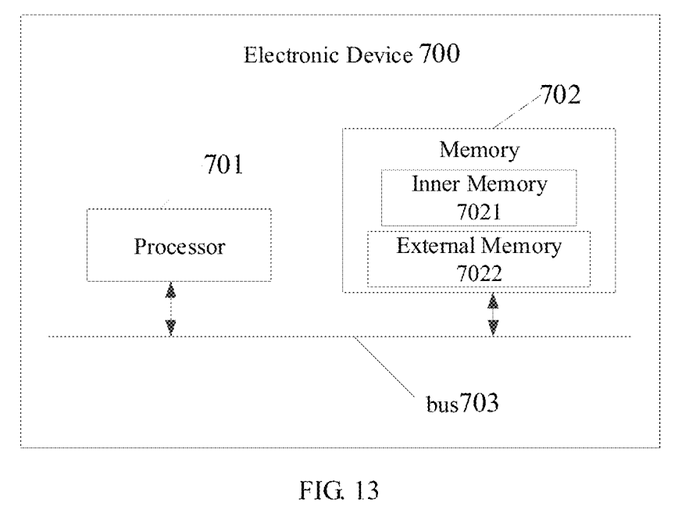
FIG. 13 is a schematic diagram of an electronic device provided by an embodiment of the present disclosure.

Based on a same technical concept, an embodiment of the present disclosure further provides an electronic device. FIG. 13 is a schematic diagram of a structure of an electronic device 700 provided by an embodiment of the present disclosure. The electronic device 700 includes a processor 701, a memory 702, and a bus 703. The memory 702 is configured to store executable instructions and includes an inner memory 7021 and an external memory 7022. The inner memory 7021 herein is also referred to an inner memory and is configured to temporarily store operational data in the processor 701, and data exchanged with the external memory 7022 such as a hard disk. The processor 701 exchanges data with the external memory 7022 by using the inner memory 7021.

In this embodiment of this application, the memory 702 is specifically configured to store application code for executing the solution of this application, and the processor 701 controls the execution. That is, when the electronic device 700 runs, the processor 701 communicates with the memory 702 by the bus 703, so that the processor 701 to execute the application code stored in the memory 702 and further execute the method described in any of the foregoing embodiments.

The memory 702 may be, but is not limited to, a random access memory (RAM), a read-only memory (ROM), a programmable read-only memory (PROM), an erasable programmable read-only memory (EPROM), an electric erasable programmable read-only memory (EEPROM), and the like.

The processor 701 may be an integrated circuit chip and has a signal processing capability. The foregoing processor may be a general-purpose processor, including a central processing unit (CPU), a network processor (NP), and the like. The processor may also be a digital signal processor (DSP), an application-specific integrated circuit (ASIC), a field programmable gate array (FPGA), or another programmable logic device, a discrete gate or a transistor logic device, or a discrete hardware component. The methods, steps, and logic block diagrams disclosed in embodiments of the present invention may be implemented or executed. The general-purpose processor may be a microprocessor, or the processor may be any conventional processor or the like.

It may be understood that, the structure shown in this embodiment of this application does not constitute a specific limitation on the electronic device 700. In some other embodiments of this application, the electronic device 700 may include more or fewer components than those shown in the figure, or combine some components, or split some components, or have different component arrangements. The components shown in the figure may be implemented by hardware, software, or a combination of software and hardware.

An embodiment of the present disclosure further provides a non-transient computer-readable storage medium, where the computer-readable storage medium stores a computer program, and when the computer program is run by a processor, the steps of the video data generation methods in the forgoing method embodiments are performed. The storage medium may be a volatile or non-volatile computer-readable storage medium.

An embodiment of the present disclosure further provides a computer program product. The computer program product carries program code. Instructions included in the program code may be used to perform the steps of the video data generation methods in the foregoing method embodiments. Reference may be made to the foregoing method embodiments for details. Details are not described herein again.

The computer program product may be realized specifically by means of hardware, software or a combination thereof. In an optional embodiment, the computer program product is specifically embodied as a computer storage medium, and in another optional embodiment, the computer program product is specifically embodied as a software product, such as a software development kit (SDK) or the like.

It may be clearly understood by a person skilled in the art that, for the purpose of convenient and brief description, for a detailed working process of the system and apparatus described above, reference may be made to a corresponding process in the foregoing method embodiments. Details are not described herein again. In several embodiments provided in the present disclosure, it should be understood that the disclosed system, apparatus, and method may be implemented in another manner. The apparatus embodiments described above are merely examples. For example, division into the units is merely logic function division and may be other division in actual implementation. For another example, a plurality of units or components may be combined or integrated into another system, or some features may be ignored or not performed. In addition, the displayed or discussed mutual couplings or direct couplings or communication connections may be implemented by using some communication interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units are integrated into one unit.

When the functions are implemented in the form of a software functional unit and sold or used as an independent product, the functions may be stored in a nonvolatile computer-readable storage medium that can be executed by a processor. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of the present disclosure. The foregoing storage medium includes: any medium that can store program code, for example, a USB flash drive, a removable hard disk, a read-only memory (ROM), a random access memory (RAM), a magnetic disk, or an optical disc.

Finally, it should be noted that the foregoing embodiments are merely specific implementations of the present disclosure, and are used to describe the technical solutions of the present disclosure, but not to limit the technical solutions of the present disclosure, and the protection scope of the present disclosure is not limited thereto. Although the present disclosure has been described in detail with reference to the foregoing embodiments, a person of ordinary skill in the art should understand that any person skilled in the art can still modify the technical solutions recorded in the foregoing embodiments, easily figure out changes, or equivalently replace some of the technical features therein within the technical scope disclosed in the present disclosure. However, these modifications, changes, or replacements do not make the essence of the corresponding technical solutions depart from the spirit and scope of the technical solutions of embodiments of the present disclosure, and should all be covered within the protection scope of the present disclosure. Therefore, the protection scope of the present disclosure shall be subject to the protection scope of the claims.

The invention claimed is:

1. A video data generation method, applied to an electronic device, wherein the electronic device is configured to run a 3D rendering environment, the 3D rendering environment comprises 3D scene information, the 3D scene information is used to generate a 3D scene after rendering, the 3D scene information comprises at least one piece of virtual image information and at least one virtual lens, the virtual image information is used to generate a virtual image after rendering, the virtual image is driven by control information captured by an action capture device, and the method comprises:
  obtaining hand control information of the virtual image, and driving, based on the hand control information, a hand of the virtual image to move relative to the 3D scene;
  controlling a position of the at least one virtual lens to move along with movement of the hand of the virtual image, wherein a relative distance between the position of the at least one virtual lens and a position of the hand of the virtual image is within a first preset range; and
  generating video data based on lens information of the at least one virtual lens and the 3D scene information;
  wherein before the obtaining the hand control information of the virtual image, the method further comprises:
  obtaining first control information of the virtual image, and driving the virtual image to perform a first corresponding action based on the first control information, wherein the first corresponding action refers to that an action performed by the virtual image is consistent with or conforms to the first control information; and
  in response to the first control information and/or the first corresponding action meeting a first preset condition, binding the at least one virtual lens with the hand of the virtual image, so that the relative distance between the position of the at least one virtual lens and the position of the hand of the virtual image is within the first preset range;
  wherein before the generating the video data based on the lens information of the at least one virtual lens and the 3D scene information, the method further comprises:
  obtaining second control information of the virtual image, and driving the virtual image to perform a second corresponding action; and
  in response to the second control information and/or the second corresponding action meeting a second preset condition, controlling to unbind the at least one virtual lens and the hand of the virtual image, and adjusting the at least one virtual lens to a state matching the second preset condition, wherein the first preset condition is different from the second preset condition.

2. The method according to claim 1, wherein an orientation of the at least one virtual lens changes with the movement of the hand of the virtual image.

3. The method according to claim 2, wherein after the generating the video data, the method further comprises:
  obtaining audio data, and fusing the video data with the audio data to generate a live video stream; and
  sending the live video stream to a target platform, so that the target platform performs video live streaming based on the live video stream.

4. The method according to claim 2, wherein after the generating the video data, the method further comprises:
sending the video data to an electronic device having a stereoscopic display function for playing.

5. The method according to claim 1, wherein an angle between a lens orientation of the at least one virtual lens and an arm of the virtual image is less than a first preset angle.

6. The method according to claim 5, wherein after the generating the video data, the method further comprises:
obtaining audio data, and fusing the video data with the audio data to generate a live video stream; and
sending the live video stream to a target platform, so that the target platform performs video live streaming based on the live video stream.

7. The method according to claim 1, wherein the binding the at least one virtual lens with the hand of the virtual image comprises:
invoking a virtual selfie stick to the 3D scene, and binding two ends of the virtual selfie stick with the hand of the virtual image and the at least one virtual lens respectively.

8. The method according to claim 7, wherein an angle between the virtual selfie stick and a vertical line of an arm of the virtual image is within a second preset range.

9. The method according to claim 1, wherein an angle between an orientation of the at least one virtual lens and an arm of the virtual image is greater than a second preset angle.

10. The method according to claim 1, wherein after the generating the video data, the method further comprises:
obtaining audio data, and fusing the video data with the audio data to generate a live video stream; and
sending the live video stream to a target platform, so that the target platform performs video live streaming based on the live video stream.

11. The method according to claim 1, wherein after the generating the video data, the method further comprises:
sending the video data to an electronic device having a stereoscopic display function for playing.

12. A non-transient computer-readable storage medium, wherein the non-transient computer-readable storage medium stores a computer program, and when the computer program is run by at least one processor, the video data generation method according to claim 1 is implemented.

13. A video data generation apparatus, comprising:
a behavior driving module, configured to: obtain hand control information of a virtual image, and drive, based on the hand control information, a hand of the virtual image to move relative to a 3D scene;
a lens control module, configured to control a position of a virtual lens to move along with movement of the hand of the virtual image, wherein a relative distance between the position of the virtual lens and a position of the hand of the virtual image is within a first preset range; and
a video generation module, configured to generate video data based on lens information of the virtual lens and 3D scene information;
wherein before the obtaining the hand control information of the virtual image, the behavior driving module is further configured to:
obtain first control information of the virtual image, and drive the virtual image to perform a first corresponding action based on the first control information, wherein the first corresponding action refers to that an action performed by the virtual image is consistent with or conforms to the first control information; and in response to the first control information and/or the first corresponding action meeting a first preset condition, bind the virtual lens with the hand of the virtual image, so that the relative distance between the position of the virtual lens and the position of the hand of the virtual image is within the first preset range;
wherein before the generating the video data based on the lens information of the virtual lens and the 3D scene information, the behavior driving module is further configured to:
obtain second control information of the virtual image, and drive the virtual image to perform a second corresponding action; and
in response to the second control information and/or the second corresponding action meeting a second preset condition, control to unbind the virtual lens and the hand of the virtual image, and adjust the virtual lens to a state matching the second preset condition, wherein the first preset condition is different from the second preset condition.

14. An electronic device, comprising:
at least one processor,
at least one memory, and
a bus,
wherein the at least one memory stores a machine-readable instruction that is capable of being executed by the at least one processor, when the electronic device runs, the at least one processor communicates with the at least one memory by the bus, and when the machine-readable instruction is executed by the at least one processor, a video data generation method is performed, wherein the video data generation method comprises:
obtaining hand control information of a virtual image, and driving, based on the hand control information, a hand of the virtual image to move relative to a 3D scene;
controlling a position of a virtual lens to move along with movement of the hand of the virtual image, wherein a relative distance between the position of the virtual lens and a position of the hand of the virtual image is within a first preset range; and
generating video data based on lens information of the virtual lens and 3D scene information;
wherein before the obtaining the hand control information of the virtual image, the method further comprises:
obtaining first control information of the virtual image, and driving the virtual image to perform a first corresponding action based on the first control information, wherein the first corresponding action refers to that an action performed by the virtual image is consistent with or conforms to the first control information; and
in response to the first control information and/or the first corresponding action meeting a first preset condition, binding the virtual lens with the hand of the virtual image, so that the relative distance between the position of the virtual lens and the position of the hand of the virtual image is within the first preset range;
wherein before the generating the video data based on the lens information of the virtual lens and the 3D scene information, the method further comprises:
obtaining second control information of the virtual image, and driving the virtual image to perform a second corresponding action; and
in response to the second control information and/or the second corresponding action meeting a second preset condition, controlling to unbind the virtual lens and the hand of the virtual image, and adjusting the virtual lens to a state matching the second preset condition, wherein the first preset condition is different from the second preset condition.

15. The electronic device according to claim 14, wherein an orientation of the virtual lens changes with the movement of the hand of the virtual image.

16. The electronic device according to claim 14, wherein an angle between a lens orientation of the virtual lens and an arm of the virtual image is less than a first preset angle.

17. The electronic device according to claim 14, wherein when performing the binding the virtual lens with the hand of the virtual image, the at least one processor is configured to:
  invoke a virtual selfie stick to the 3D scene, and bind two ends of the virtual selfie stick with the hand of the virtual image and the virtual lens respectively.

* * * * *